United States Patent [19]

Linn

[11] 4,412,753
[45] Nov. 1, 1983

[54] QUICK-OPENING BEARING BLOCK

[76] Inventor: James F. Linn, P.O. Box 511, Tallmadge, Ohio 44278

[21] Appl. No.: 299,084

[22] Filed: Sep. 3, 1981

[51] Int. Cl.³ .............................................. F16C 35/02
[52] U.S. Cl. .................................. 384/437; 384/434; 384/435; 384/436
[58] Field of Search .............. 308/75, 74, 240, 237 R, 308/53, 121; 24/249 R, 249 LS, 327, 248 B, 250, 137 R, 137 A, 349, 221 R; 384/432, 434, 437, 436, 435

[56] References Cited

U.S. PATENT DOCUMENTS

| | | | |
|---|---|---|---|
| 115,715 | 6/1871 | Davol | 24/248 B |
| 452,509 | 5/1891 | Snell | 308/75 |
| 874,979 | 12/1907 | Murphy | 308/75 X |
| 1,523,328 | 1/1925 | Wilson | 308/75 X |
| 3,025,093 | 3/1962 | Millman | 24/221 R |
| 3,508,798 | 4/1970 | Geuss | 308/237 R |

*Primary Examiner*—Stuart S. Levy
*Assistant Examiner*—Thomas R. Hannon
*Attorney, Agent, or Firm*—John J. Murphey

[57] ABSTRACT

A quick-opening bearing block containing a set of bearings to support a rotating shaft comprising a block base, mountable to a supporting surface, containing the lower bearing, a cover hinged to the base, containing the upper bearing, where the hinge is spaced apart from the bearings, and a T-shaped fastener mounted on the base between the bearings and the hinge, adapted to pass through a slot formed in the cover, to permit the cover to be opened and closed quickly, and thereafter locked down in closed position on top of the base to support the shaft in the bearings by simply twisting the fastener out of alignment with the slot.

5 Claims, 3 Drawing Figures

QUICK-OPENING BEARING BLOCK

BACKGROUND OF THE INVENTION

1. Field of the Invention

This invention pertains to the field of bearings. More particularly, this invention pertains to the field of bearing blocks and fixtures that contain a set of split bearings to support a rotatable shaft or other element such as a ball in a ball and socket joint.

2. Description of the Prior Art

More and more articles are being made from roll goods; heavy cardboard boxes are being replaced with plastic bags; automobile paint finishes are being replaced with adhesive-coated plastic films; and newspaper photogravure is being replaced with high-speed photographed plastic film. In virtually all of these transitions there is involved the use of sheet goods wrapped or supported on a shaft, where the shaft is temporarily mounted horizontally and allowed to rotate to either unwind or windup a film, carrier or other type of thin material.

While in some of these operations it is sufficient to merely support the horizontal shaft temporarily in a rough saddle, in many, if not most present-day computer-controlled factory methods, the rotation of the shaft is precisely indexed to other operations and requires that the shaft be not only carefully supported in lubricated bearings but housed in a bearing block capable of quick and accurate opening and closing to permit rapid interchange of shafts. The traditional V-shaped open brass or bronze bearing saddle is coming to the end of its useful life.

Bearing blocks are not new; two general types prevail in industry today. The two-piece precision bearing block includes a base, mounted to a support surface, containing the bottom half of a precision ground bronze or other metal bearing and a top or cover that fits down on top of the base, containing the top half of the bearing where a bolt or other fastener is dropped through vertically aligned holes on either side of the bearing to clamp the shaft therein. Lines carrying lubricant to the bearing are connected to the top and bottom bearing halves. To replace the shaft, the bolts are removed, the top bearing half lifted from the shaft, the shaft interchanged, and the operation reversed. While this bearing block provides firm, steady shaft support it is considered too cumbersome and time-consuming for many high speed operations.

A one-piece bearing block (unitary assembly as opposed to two separate pieces) has been used where down-time for shaft interchange is required to be minimized. This block has an elongated base, carrying the lower bearing at one end, and is hinged to an elongated top or cover at the other end, where the cover carries the upper bearing for engagement with the lower bearing to hold the shaft therebetween. The base and top are held together by a bolt, pivotally mounted on the end of the base opposite the hinge and outboard of the bearing, that engages a two-prong dog, extending from the end of the cover, by means of a cross-pin. Closing pressure is applied by twisting a retaining nut down the bolt to force the cross-pin against the dog and squeeze the shaft between the top and bottom bearings. Problems have been encountered in that the closing mechanism, being on the opposite side of the bearing from the hinge, tends to pinch the shaft in the bearing, especially where interchanged shafts vary in diameter, introducing unwanted friction (sticking) into the shaft-rotation operation causing heat, loss of lubricant, uneven bearing wear and a higher incident of bearing replacement. In addition, the alignment of the closing bolt, precise positioning of the cross-pin in the hold-down dog and the tensioning of the retaining nut requires a degree of manual dexterity often found lacking in the labor force.

OBJECTS OF THE INVENTION

This invention is a quick-opening (and closing) one-piece bearing block whose unique design overcomes the hereinbefore described problems with the prior art devices. The bearing block of this invention contains few movable pieces, requires only a slight movement of one element to go from full locked closed to full unlocked open position and provides even pressure over the entire bearing surface.

Accordingly, the main object of this invention is a bearing block, for supporting shafts and other like elements, that provides quick opening and closing for rapid shaft interchange. Another object of this invention is a one-piece bearing block, that provides smooth, even pressure to the shaft carried in the bearing. A still further object of this invention is a one-piece bearing block that provides quick opening and closing features, smooth, even pressure to the shaft carried in the bearing and also that will accommodate a rather wide range of shaft diameter variation. These and other objects of this invention will become more apparent by reading the following Description of the Preferred Embodiment in conjunction with the drawings attached hereto.

DESCRIPTION OF THE PREFERRED EMBODIMENT

Figure 1:
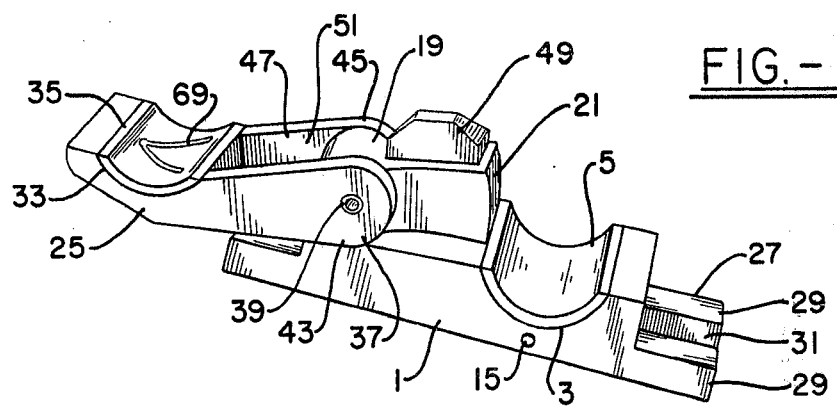
FIG. 1 is an elevated view of the preferred embodiment of this invention showing the bearing block in its open position.
Figure 2:
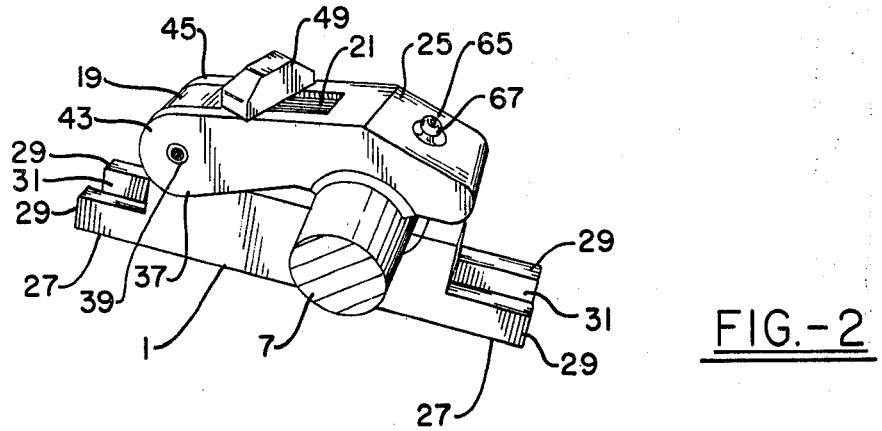
FIG. 2 is an elevated view of the preferred embodiment of this invention showing the bearing block in its closed position.
Figure 3:
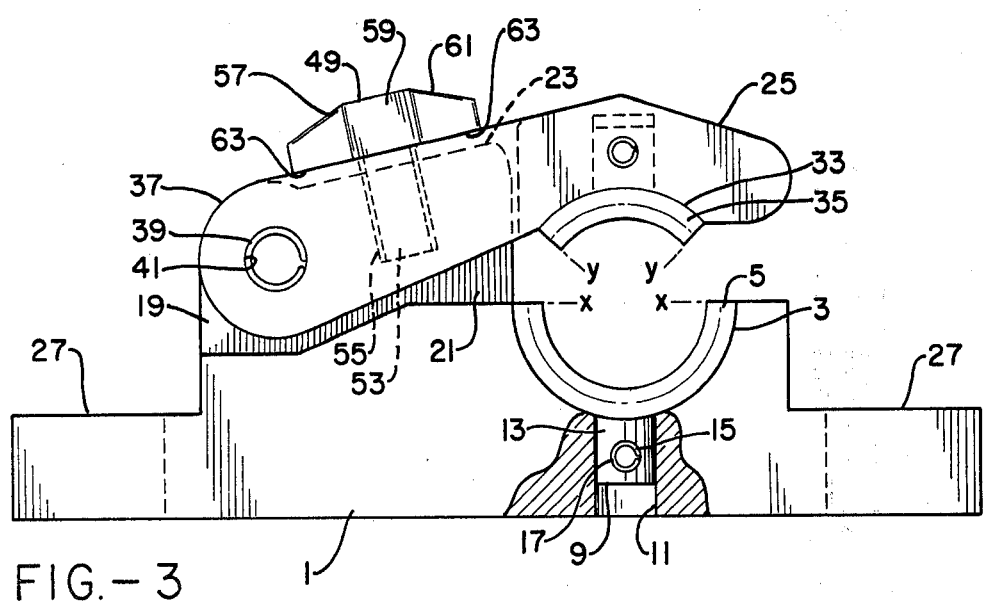
FIG. 3 is a side elevation view of the preferred embodiment of this invention one of the bearing mounting means being in section and the position of fastener in the post indicated by dotted lines.

The bearing block of this invention is shown in open position in FIG. 1 and comprises a block base 1, preferably elongated, of metal such as cast iron, aluminum, etc., containing a lower bearing cup 3 at one end to house a lower bronze bearing 5 therein. While this invention can be used to support a ball formed on the end of a shaft, its preferable use is to support a cylindrical shaft 7, such as shown in FIG. 2. Accordingly, lower bearing 5 preferably is semicylindrical and of a fixed cylindrical circumferential length X—X, as shown in FIG. 3, so as not to extend above the top of bearing cup 3 and interfere with the opening and closing function of the bearing block. Included with lower bearing 5 are means 9 to mount said bearings in cup 3. As shown in FIG. 3, means 9 comprises an aperture 11 formed in base 1 that receives a lug 13, extending from under bearing 5 that is held therein by cross-pin 15 extending through an aperture 17 in base 1 transverse to aperture 11. Other means of mounting bearing 5 in cup 3 are contemplated within the scope of this invention such as welding, soldering, threaded connections, etc., that are all well-known in the art.

Spaced apart from bearing cup 3 and at the other end of elongated base 1 is a lower half-hinge section 19, preferably a lower center half-hinge section. Between lower bearing cup 3 and lower half-hinge section 19 is a post 21 that preferably extends upward from base 1 having a top surface 23 terminating slightly below block cover 25 when the bearing block is in closed position as shown in FIGS. 2 and 3. As shown in FIG. 1, it is better that post 21 is made as an integral part to center half-hinge section 19; this is done to increase the overall strength of the bearing block and reduce casting costs.

While this bearing block can adequately function by resting on a surface sans rigid mounting, it is preferred that a mount means 27 be placed outboard of half-hinge 19 and bearing cup 3, such as shown in the drawings at the ends of elongated base 1, to mount base 1 to a resting surface. As shown, mount means 27 comprises a pair of spaced apart arms 29 extending from the ends of block 1 having a slot 31 formed therebetween to receive a bolt or other fastener for connection with the lower resting surface (not shown). Other configurations of mount means 27 are contemplated in this invention such as holes or other apertures formed in the ends of bearing block base 1, cross-pin-latch mechanisms, etc., that are well-known in the art.

Hinged to block base 1 is block cover 25, preferably elongated to form a compact unit with base 1. Cover 25 comprises an upper bearing cup 33 at one end to house an upper bronze bearing 35 therein. With similar respect to lower bearing cup 3 and lower bearing 5, upper bearing 35 is preferably semicylindrical to support cylindrical shaft 7 although it may take on other configurations to support other shafts such as a ball formed at the end of a shaft (not shown). The fixed cylindrical circumferential length Y—Y of upper bearing 35 is less or shorter than length X—X so that bearing 35 may accommodate shafts of slightly varying diameter and so as not to interfere with the closing motion of cover 25. Bearings 5 and 35 are usually made of bronze but other bearing materials are contemplated herein including other metals and plastics of all sorts.

Spaced apart from upper bearing cup 33 and at the other end of elongated block cover 25 is upper half-hinge section 37 for connection with lower half-hinge section 19 in base 1 to form a workable hinge. Hinge sections 19 and 37 are shown to be held in hinge-like arrangement by a cross-pin 39 received an an elongated aperture or bore hole 41 formed in sections 19 and 37 transverse to the plane of hinge movement (not shown). Other types of pins are contemplated in lieu of cross-pin 39 including roll-pins, cotter pins, etc., that are well-known in the art.

In the preferred embodiment of this invention upper half-hinge section 37 comprises a pair of parallel, spaced apart half-hinge section arms, 43 and 45, that receive central lower half-hinge section 19 therebetween to form a three-section hinge. An elongated aperture 47 is formed in cover 25 between upper bearing cup 33 and upper half-hinge section 37 to permit the free passage therethrough of a fastener 49 that is mounted on top of post 21. As shown in FIGS. 1 and 2, aperture 47 is in the form of an elongated slot 51, extending from upper half-hinge section 37 toward upper bearing cup 33 and integral with the space between arms 43 and 45.

Fastener 49 comprises lower portion 53 threadably received in an aperture 55 bored or drilled down into the top of post 21 and an upper portion 57 comprising elongated narrow opposing side-walls 59, adapted to pass through slot 51 when aligned elongatedly therewith, and curved or slanted top or cover surface 61 that allows free and unchartered swing of cover 25 from full closed to full open position over block base 1. It is preferred that fastener 49 be T-shaped as shown in FIG. 3. A pair of locking surfaces 63 are formed on the bottom of side-walls 59 that abut the top of cover 25 when fastener upper portion 57 is twisted out of alignment with slot 51. This is a unique feature of this invention, namely that block cover 25 can be quickly opened and closed by merely aligning fastener side-walls 59 with slot 51 and, once closed, can be quickly locked into support of a shaft by simply twisting fastener 49 out of alignment with slot 51 to force locking surface 63 to abut the top of cover 25.

Lubricating means 65 is shown in FIG. 1 as an optional addition to this invention. Means 65 includes mating passageways through cover 25, upper bearing cup 33 and upper bearing 35 (not shown) that terminate, on the topside of cover 25 at grease fitting 67 and, on the inside, at lubricant grooves 69 formed on the bearing surface of upper bearing 35. Lubricant injected into fitting 67 will flow through the passageways and enter grooves 69 to smear over the surface of bearings 5 and 35 and shaft 7 thereby reducing friction therebetween and prolonging the life of the bearings. Lubricating means 65 may also be similarly provided in block base 1 to supply even more lubricant to the bearings.

What is claimed is:
1. A quick-opening bearing block comprising:
   (a) an elongated block base comprising:
     (1) a lower bearing cup at one end;
     (2) a lower center half-hinge section at the other end, spaced apart from said cup;
     (3) an upwardly-extending post between said cup and said half-hinge;
     (4) a lower semicylindrical bearing of fixed cylindrical circumferential length in said lower bearing cup for receiving a cylindrical shaft therein including means for mounting said bearing in said cup; and,
     (5) a mount at each end of said base, including a slot therein, for receipt of a pin or bolt to fasten said base to a supporting surface;
   (b) an elongated block cover comprising:
     (1) an upper bearing cup at one end, adapted to mate with said lower bearing cup;
     (2) a spaced apart pair of upper half-hinge sections at the other end thereof, adapted to receive said central lower half-hinge section therebetween and including a pin to connect said half-hinge sections together;
     (3) a slot extending, from said spaced apart pair of upper half-hinge sections, toward said bearing cup to permit receipt of said post therethrough; and,
     (4) an upper semicylindrical bearing of shorter cylindrical circumferential length in said bearing cup, to accommodate shafts of varying diameter and to compensate for bearing wear, including means for mounting said bearing in said cup;
   (c) a T-shaped fastener having a lower portion, threadably received into said post, and an upper portion containing narrow, elongated opposing sides adapted to allow said fastener to pass freely through said slot in said block cover when aligned therewith as said cover is opened and closed comprising:
  (1) a slanted upper surface to permit said cover to swing unopposed from full extended open position to full closed position on top of said base; and,
  (2) a pair of lower locking surfaces to abut the top of said cover, as said fastener is twisted inward toward said base, to close and hold said block cover tightly down on said base when a cylindrical shaft is to be carried between said bearings.

2. The block of claim 1 including lubricating means in at least one of said bearings.

3. The block of claim 2 wherein said lubricating means include:
  (a) mating passageways in said bearings and said bearing cups;
  (b) a grease fitting connecting said passageways to the outside for receipt of a lubricating device; and,
  (c) a groove in the bearing surface of said bearing to distribute the lubrication thereover.

4. A quick-opening bearing block comprising:
  (a) a block base comprising;
    (1) a lower bearing cup;
    (2) a lower half-hinge, at one side of said base, spaced apart from said cup;
    (3) a post between said cup and said half-hinge; and,
    (4) a lower bearing in said lower bearing cup including means for mounting said bearing in said cup;
  (b) a block cover comprising:
    (1) an upper bearing cup;
    (2) an upper half-hinge, spaced apart from said cup, adapted to mate with said lower half-hinge and including a pin to connect said half-hinges together;
    (3) an elongated aperture formed therein between said cup and said half-hinge over top of said post; and,
    (4) an upper bearing in said upper bearing cup including means for mounting said bearing in said cup;
  (c) a fastener, threadably carried on said post having one pair of elongated opposing sides adapted to pass freely through said aperture when aligned therewith as said cover is opened and closed comprising;
    (1) a slanted upper surface to permit said cover to swing unopposed from full extended open position over to on top of said base in full closed position with a shaft or other element to be carried between said upper and lower bearings; and,
    (2) common lower locking surfaces to abut the top of said cover, as said fastener is twisted down toward said base, to close and hold said upper bearing tightly down on what is carried between it and said lower bearing wherein said upper bearing is smaller than said lower bearing to accommodate shafts of varying diameter therebetween and to compensate for bearing wear.

5. A quick-opening bearing block comprising:
  (a) an elongated block base comprising:
    (1) a lower bearing cup at one end;
    (2) a lower half-hinge at the other end, spaced apart from said cup;
    (3) a post between said cup and said half-hinge; and,
    (4) a lower bearing in said lower bearing cup including means for mounting said bearing in said cup;
  (b) an elongated block cover comprising:
    (1) an upper bearing cup at one end, adapted to mate with said lower bearing cup;
    (2) an upper half-hinge at the other end thereof adapted to mate with said lower half-hinge and including a pin to connect said half-hinges together;
    (3) a slot formed therein, between said cup and said half-hinge, over top of said post; and,
    (4) an upper bearing in said upper bearing cup including means for mounting said bearing in said cup;
  (c) a fastener threadably carried on said post and having narrow, elongated opposing sides, adapted to allow said fastener to pass freely through said slot in said block cover as said cover is opened and closed, comprising:
    (1) a slanted upper surface to permit said cover to swing unopposed from full extended open position to full closed position on top of said base; and,
    (2) a pair of lower locking surfaces to abut the top of said cover, as said fastener is twisted inward toward said base, to close and hold said block cover tightly down on said base when a shaft or other element is to be carried between said bearings wherein said upper bearing is smaller than said lower bearing to accommodate shafts of varying diameter therebetween and to compensate for bearing wear.

* * * * *